Patented May 5, 1931

1,803,781

UNITED STATES PATENT OFFICE

HERMANN WAGNER, OF BAD SODEN-ON-THE-TAUNUS, AND RUDOLF BRUNE, OF FRANK-FORT-ON-THE-MAIN-HOCHST, GERMANY, ASSIGNORS TO GENERAL ANILINE WORKS, INC., OF NEW YORK, N. Y., A CORPORATION OF DELAWARE

PROCESS OF PREPARING THE 2-NITRILE OF ARYL-1-THIOGLYCOL-2-CARBOXYLIC ACIDS CONTAINING BROMINE AND NEW PRODUCTS OBTAINABLE THEREBY

No Drawing. Application filed December 6, 1928, Serial No. 324,311, and in Germany May 5, 1925.

The present invention relates to a new process of preparing the 2-nitrile of aryl-1-thioglycollic-2-carboxylic acids containing bromine and to new products obtainable thereby.

We have found that the nitriles of aryl-1-thioglycollic-2-carboxylic acids may be transformed into the bromine substitution products by the action of bromine, without further changing the starting products in any manner.

Furthermore we have found that the process may advantageously be carried out in such a manner that the bromination is effected in the presence of a catalyst, for instance mercury.

The following examples serve to illustrate the invention, but they are not intended to limit it thereto, the parts being by weight.

1. 48 parts of 3-methyl-5-chloro-phenyl-1-thioglycollic-2-carboxylic acid nitrile of the formula:

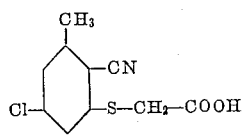

are dissolved in 500 parts of concentrated sulfuric acid. Then 33 parts of bromine are gradually introduced in the course of half an hour at 18° C. to 25° C., while well stirring. The whole is stirred for 20 minutes, poured on ice, filtered by suction and washed. When recrystallized from methyl alcohol, the 3-methyl-4-bromo-5-chloro-phenyl-1-thioglycollic-2-carboxylic acid nitrile thus obtained melts at 197° C. to 200° C.

2. 49 parts of the 5-methoxy-phenyl-1-thioglycollic-2-carboxylic acid nitrile are brominated as described in Example 1. When recrystallized from methyl alcohol, a brominated acid nitrile compound is obtained which melts at 163° C. to 165° C.

3. 48 parts of the 3-methyl-5-chloro-phenyl-1-thioglycollic-2-carboxylic acid nitrile are dissolved in 500 parts of concentrated sulfuric acid with addition of 2.5 parts of mercury. Into this solution 33 parts of bromine are gradually introduced in the course of half an hour at 18° C. to 25° C., while well stirring. Then the whole is stirred for 20 minutes, poured on ice, filtered by suction and washed. When recrystallized from methyl alcohol, the 3-methyl-4-bromo-5-chloro-phenyl-1-thioglycollic-2-carboxylic acid nitrile thus obtained, melts at 197° C. to 200° C.

Instead of sulfuric acid also other diluents may be used, such as for instance glacial acetic acid, chlorinated hydrocarbons, water or the like.

As is known, the recrystallization of thioglycollic acid compounds as well as of other carboxylic acid compounds in alcohols, such as methyl alcohol, has to be carried out carefully, in order to avoid the esterification of the carboxylic acid group into the corresponding carboxylic acid ester group. The esterification may be avoided, for instance, by carrying out the recrystallization process quickly or by using a methyl alcohol which is, diluted with water.

We claim:

1. The process which comprises subjecting an aryl-1-thioglycollic-2-carboxylic acid nitrile to the action of bromine in the presence of a solvent which is inert to halogen.

2. The process which comprises subjecting 3-methyl-5-chloro-phenyl-1-thioglycollic-2-carboxylic acid nitrile to the action of bromine in the presence of a solvent which is inert to halogen.

3. The process which comprises subjecting 3-methyl-5-chloro-phenyl-1-thioglycollic-2-carboxylic acid nitrile to the action of bromine which is run into the reaction mass drop by drop, while stirring in the presence of concentrated surfuric acid at a temperature of about 18° C. to 25° C.

4. The process which comprises subjecting 3-methyl-5-chloro-phenyl-1-thioglycollic-2-carboxylic acid nitrile to the action of bromine which is run into the reaction mass drop by drop, while stirring, in the presence of concentrated sulfuric acid and of a catalyst which favors aromatic ring halogenation at a temperature of about 18° C. to 25° C.

5. The process which comprises dissolving 3-methyl-5-chloro-phenyl-1-thioglycollic- 2-carboxylic acid nitrile in concentrated sulfuric acid and introducing bromine into this solution drop by drop, while stirring, in the presence of a small quantity of mercury and at a temperature of about 18° to 25° C.

6. As new products the compounds of the following formula:

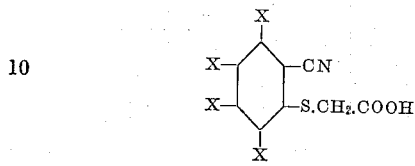

wherein one X stands for bromine, at least one X for alkoxy, halogen or alkyl, and the other X's for hydrogen or univalent substituents.

7. As a new product 3-methyl-4-bromo-5-chloro-phenyl-1-thioglycollic-2-carboxylic acid nitrile of the following formula:

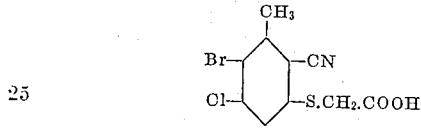

melting at 197° to 200° C.

In testimony whereof, we affix our signatures.

HERMANN WAGNER.
RUDOLF BRUNE.